United States Patent
Eckelman et al.

(10) Patent No.: US 7,076,706 B2
(45) Date of Patent: Jul. 11, 2006

(54) METHOD AND APPARATUS FOR ABIST DIAGNOSTICS

(75) Inventors: Joseph E. Eckelman, Hopewell Junction, NY (US); Thomas J. Knips, Wappingers Falls, NY (US)

(73) Assignee: International Business Machines Corporation, Armonk, NY (US)

( * ) Notice: Subject to any disclaimer, the term of this patent is extended or adjusted under 35 U.S.C. 154(b) by 635 days.

(21) Appl. No.: 09/841,569

(22) Filed: Apr. 24, 2001

(65) Prior Publication Data

US 2002/0157051 A1  Oct. 24, 2002

(51) Int. Cl.
    *G01R 31/28* (2006.01)
(52) U.S. Cl. ..................................... 714/726
(58) Field of Classification Search ............... 714/718, 714/724, 764, 768, 763, 704, 733, 739, 742, 714/708, 710, 30, 719, 726
    See application file for complete search history.

(56) References Cited

U.S. PATENT DOCUMENTS

| | | | |
|---|---|---|---|
| 5,337,318 A * | 8/1994 | Tsukakoshi et al. | 714/708 |
| 5,633,877 A | 5/1997 | Shephard, III et al. | |
| 5,659,551 A | 8/1997 | Huott et al. | |
| 5,661,732 A | 8/1997 | Lo et al. | |
| 5,706,234 A * | 1/1998 | Pilch et al. | 365/201 |
| 5,790,559 A * | 8/1998 | Sato | 714/720 |
| 5,805,789 A | 9/1998 | Huott et al. | |
| 6,041,429 A * | 3/2000 | Koenemann | 714/738 |
| 6,115,828 A * | 9/2000 | Tsutsumi et al. | 714/7 |
| 6,125,465 A | 9/2000 | McManara | |
| 6,594,788 B1 * | 7/2003 | Yasui | 714/710 |
| 6,615,378 B1 * | 9/2003 | Dwork | 714/733 |

* cited by examiner

*Primary Examiner*—Albert Decady
*Assistant Examiner*—Mujtaba K. Chaudry
(74) *Attorney, Agent, or Firm*—Lynn L. Augspurger

(57) ABSTRACT

A method for real time capture of the desired failing chip cell diagnostic information from high speed testing of a semiconductor chip with on chip LSSD registers having built in self test functions and a fail trap register, and there is provided a programmable skip fail counter, and a hold and compare function circuit. The programmable skip counter is enabled for initialization to a "record first fail" mode, and then with non-zero values of the skip counter to a "record next fail" mode with scan initialization of the LSSD registers of the semiconductor chip. The diagnostic information for the chip is obtained by collecting data from scanning the circuits of said semiconductor chip for a failing cell for immediate scan-out off-chip at a level of assembly test.

7 Claims, 3 Drawing Sheets

METHOD AND APPARATUS FOR ABIST DIAGNOSTICS

FIELD OF THE INVENTION

This invention relates to integrated chip diagnostics, and particulary to an improvement ABIST diagnostic method and apparatus for use in testing system components, such as SRAM and DRAM devices.

Trademarks

IBM is a registered trademark of International Business Machines Corporation, Armonk, N.Y., U.S.A. Other names may be registered trademarks or product names of International Business Machines Corporation or other companies.

BACKGROUND

High speed, density and reliability requirements for computer system applications of static random access memory (SRAM) require efficient and effective test applications for process and manufacture viable components for high end processor products. Manufacturing yield, and ultimately product cost is an integral part of the ability to design, manufacture, and sell computer systems in the marketplace. A key requirement to achieving leading edge technology implementations is the ability to diagnose problems in the design/manufacturing process for early resolution, in a timely fashion, and to lower overall technology cost, prior to product volume ramp-up. Efficient SRAM/DRAM designs stress the manufacturing process capability due to the high device usage (transistor elements) in a given area (smaller memory cell yields higher number of bits per chip), and the high end processor applications demand high memory bit usage. This yields an increased sensitivity to process defects over the accompanying logic, typically, and this drives the need to analyze, understand, and eventually reduce overall process defect density to achieve product yield and cost requirements.

To this end IBM uses integrated self test, and particularly for the memory arrays, the Array Built In Self Test (ABIST) has been employed to provide deterministic test coverage ensuring high quality products. Diagnosis of fails to initial manufacturing test and subsequent stress screens are critical to yield diagnostics and product reliability improvement efforts, as they are more realistic indicators than monitor structures. Monitor structures are easier to diagnose, but are only models of the product/process interaction, and are expensive from the perspective of area overhead and process productivity.

Diagnosis of array cell failures currently requires execution of the ABIST algorithm, synchronous to an external test system, during which an off-chip fail indicator is monitored, on a cycle-by-cycle basis, to determine at which points in the test the array fails. The external test equipment is used to record the failing cycles, and to repeat the test algorithms stopping "n" cycles prior to each fail, to account for the number of cycles required to "pipe" the fail indicator to an observe point, where the failing state of the array data bus can be scanned off-chip for analysis. Given the failing cycles of the ABIST algorithm, one can calculate the expected memory array data for the test and compare to the failing data scanned from the chip. The combination of the calculation of failing memory array data out, and the algorithmic calculation from the self test engine state to obtain the memory array address location together provide sufficient information for a logical cell determination of the fail. This requires clocking the array in a synchronous manner with the external test exerciser (tester) and the ability to successfully repeat failure on each of multiple passes through the test algorithm.

The technique falls short if the fails are not "hard" repeatable fails. If a fail is on the edge of the point of failure, ("soft" fails) which sometimes fails or not depending on the conditions at the time of execution, it is difficult to capture and verify. Also, AC defects (defects dependent on the speed/rate at which the algorithm is applied) are not detectable if the exerciser (tester) is not able to apply the test algorithm at the failing cycle time. This process is insufficient for diagnosis of those defects that are not detectable at test frequencies that can be provided by external test equipment, but rather rely on on-chip clock frequency multiplication techniques to multiply tester provided clock signal frequencies to those that meet or exceed the intended application.

This process is workable for low incidents of reliability or line return fails, but is insufficient for line monitoring activity or identification of nonrandom manufacturing defects (such as mask defects, also known as "repeaters") due to the interactive nature of the procedures, and the test hardware and manpower resources required.

SUMMARY OF THE INVENTION

This invention provides a method and apparatus for real time capture of the desired failing memory cell diagnostic information from high speed ABIST testing. This data is obtained for immediate scan-out off-chip at any level of assembly test, such as initial manufacturing wafer test, module test, including system level test, regardless of the clocking methodology. Therefore, combined with current state of the art ABIST techniques, this invention provides in-situ real time ABIST deterministic test cell fail diagnostic information. In addition, the invention provides not only for the data collection of the first failing cell, it can also be programmed to skip up to the "$N^{th}$" failing cell and record the subsequent "$N^{th}$"+1 fail instead.

The invention apparatus takes partial advantage of existing ABIST design hardware required to generate test vectors for array products, by reusing existing address register fields, and supplementing where necessary to provide for complete device under test address fields. These address registers are pipe-lined to provide data synchronous to the existing ABIST fail determination circuitry. In addition, existing ABIST comparison circuitry is used to provide a bit wise fail result vector corresponding to each of the data outs of the memory array or device under test. This fail result vector feeds a unique detect and encode circuit that determines if one and only one array data out failed, and if so, provides an encoded "address" that is concatenated to the memory array address field. Usage of the detect and encode method is proposed here as sufficient to describe failed memory array locations for efficient (minimal hardware apparatus) real time data collection.

The pipe-lined data is then fed into a hold and compare function. This hold portion of the function provides for the "full" fail address field (as defined to be the memory address of the device under test+the failing output encoded address, together sufficient to describe the failing location, or cell, in the memory array) to be stored and held in an LSSD register. The compare function provides for subsequent unique and different failing locations in the memory array to be identified. The hold and compare function is configured to load the first and reload each subsequent unique failing location encountered, decrementing the programmable skip counter at each unique fail encountered, until the skip counter reaches the final "zero" state, or the intended "$N^{th}$" fail to be recorded. It is recognized that the primary usage of the function will be to allow the default skip counter of zero thus enabling the first fail to be recorded by the aforementioned apparatus.

These and other improvements are set forth in the following detailed description. For a better understanding of the invention with advantages and features, refer to the description and to the drawings.

Figure 1:
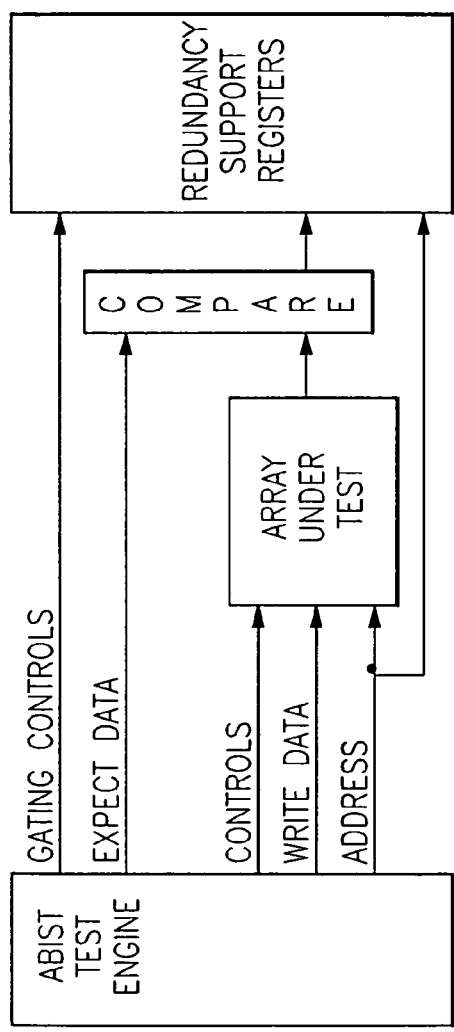
FIG. 1 shows a typical ABIST implementation represented by array system support elements and their configuration.

Our detailed description explains the preferred embodiments of our invention, together with advantages and features, by way of example with reference to the drawings.

DETAILED DESCRIPTION OF THE INVENTION

As we have noted, this development of our improved method and apparatus for real time capture of the desired failing memory cell diagnostic information from high speed ABIST testing uses the data obtained for immediate scan-out off-chip at any level of assembly test, such as initial manufacturing wafer test, module test, including system level test, regardless of the clocking methodology. Therefore, combined with current state of the art ABIST techniques, this provides in-situ real time ABIST deterministic test cell fail diagnostic information. In addition, the date is collected not only for the data collection of the first failing cell, it can also be programmed to skip up to the "$N^{th}$" failing cell and record the subsequent "$N^{th}$"+1 fail instead.

By virtue of the described method and apparatus we believe we have provided an extremely cost effective solution to the problem of AC (high speed) memory array cell diagnostics for both "hard" and "soft" defect mechanisms. Given that large on-chip memory macros are the primary semiconductor device yield drivers, they currently employ built in self test and some form of redundancy support for overall yield enhancement. By taking advantage of existing test infrastructure, this adds only a small percentage overhead, estimated at no more than 15% increase in overall ABIST area.

Data is collected initially and continually for immediate and continual data collection of manufacturing yield diagnostic information for every memory macro tested, whether the part yields or not, and whether or not redundant elements will be used to invoke repair. There is no test time impact, and no restriction to wafer level test data sites. Every macro, every part, every environmental test condition or test segment will have the benefit of diagnostic cell calls as part of the LSSD scan-out to obtain the manufacturing test results. See IBM Journal of Research and Development, "Boundary-Scan Design Principles for Efficient LSSD ASIC Testing " by R. W. Bassett et al., Vol. 34, No. 2/3, March/May 1990. The use of existing array deterministic diagnostics for ABIST would typically be applied for use with a semiconductor chip which already has the circuits as described by Huott et al. in U.S. Pat. No. 5,659,441, such as a semiconductor chip having a VLSI array for storing information having redundant areas, and an array built-in, on-chip test system (ABIST) for testing the VLSI array. The existing ABIST uses data input ports, data output ports, and address ports, and includes a data control register for generating and applying deterministic data patterns to the data input ports of said VLSI array. An address control register is provided for generating addresses for application to the chip in coordination with a data control register. A comparator is provided for comparison of data inputted to the data input ports of the VLSI array from the data control register with data outputted from the data output ports of said VLSI array. This comparator includes a failing address function store for retaining failing addresses. A memory array is used for storing a plurality of microcode control vectors, each vector including a data control register field, an address control register field, a microcode pointer control register field and a read/write enable control field; a microcode pointer control register and finite state machine. There are also controls for the address control register, said data control register and said microcode pointer control register which control them in response to a plurality of microcode control vectors. There is also an overflow feedback state for the data control register and address control register. The use of redundancy provides areas for replacing normal functional areas of the VLSI array with the ABIST comparator retaining failing addresses indicating that a hardware error has been detected on power-on of said computer system element. These elements are described in detail in U.S. Pat. No. 5,659,551 "Programmable computer system element with built-in self test method and apparatus for repair during power-on", issued Aug. 19, 1997.

In addition, for early life stress testing, burn-in, or extended voltage test, results will include diagnostic cell call information of any fail detected. This will have a significant impact by reducing traditional diagnostic re-test lead time, test equipment resource and manpower, and lead time to schedule and collect data required to guide Physical Failure Analysis efforts and establish timely problem resolution actions for line control. Subsequent level of assembly test will also see this described benefit.

The preferred embodiment of our invention will be described herein with relation to existing ABIST implementations, such as those described in patents which are mentioned below and incorporated herein by reference, including the patents of Dreibelbis et al., U.S. Pat. No. 5,961,653 entitled "Processor based BIST for an embedded memory" issued Oct. 5, 1999, and the patent of Koch et al, U.S. Pat. 5,535,164 for a BIST tester for multiple memories and will further reference this as the ABIST test engine wherein Dreibelbis describes an integrated chip having a DRAM embedded in logic is tested by an in-situ processor oriented BIST macro. The BIST is provided with two ROMS, one for storing test instructions and a second, which is scannable, that provides sequencing for the test instructions stored in the first ROM, as well as branching and looping capabilities. The BIST macro has, in addition, a redundancy allocation logic section for monitoring failures within the DRAM and for replacing failing word and/or data lines. By stacking the DRAM in 0.5 mb increments up to a 4.0 mb maximum or in 1.0 mb increments up to an 8 mb maximum, all of which are controlled and tested by the BIST macro, a customized chip design with a high level of granularity can be achieved and tailored to specific applications within a larger ASIC.

The support for two dimensional redundancy allocation as described by Hedberg and Koch specifically for memory array test is U.S. Pat. No. 5,859,804 entitled "Method and apparatus for real time two dimensional redundancy allocation" issued Jan. 12, 1999 which should also be and is referenced for two dimensional redundancy allocation. The U.S. Pat. No. 5,859,804 circuit provided an array built in self test (ABIST) system disposed on a single semiconductor chip. The chip provided a memory array having a plurality of column lines and a plurality of row lines and at least one redundant column line and at least one redundant row line with cells coupled to the lines at intersections thereof. This patent thus described a method and apparatus provided in an array built in self test (ABIST) environment formed on the semiconductor chip having an array of memory cells arranged in columns and rows and column and row redundant lines which includes testing the array along the columns to identify a given number of faulty cells in each of the columns, storing the column addresses having the given number of faulty cells in first registers, further testing the array along the columns or rows to identify any additional faulty cells while masking the cells having the stored column addresses and storing the row addresses having the faulty cell in second registers until all of the second registers store row addresses, and after all of the second registers store row addresses, continue testing the array while masking the cells having the stored column or row addresses and storing the column addresses of any remaining additional faulty cell in any unused register of the first registers.

Figure 3:
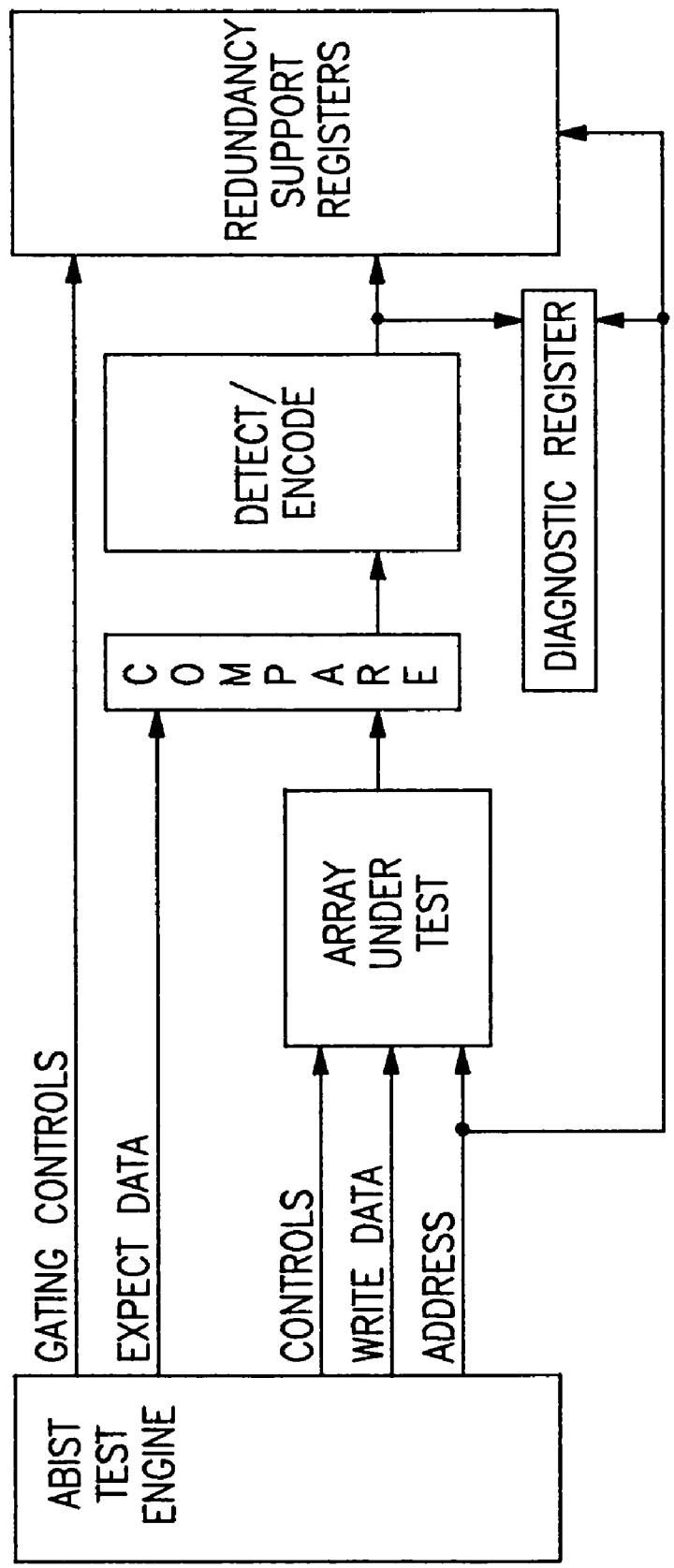
FIG. 3 illustrates the preferred embodiment of the ABIST diagnositic apparatus element connection for the diagnostic tests herein described.

The first level of description of the preferred embodiment of the herein proposed method and apparatus are block level diagrams showing the major components of an overall ABIST system. FIG. 3 will show the appurtenant structure of the preferred embodiment.

FIG. 1 shows a typical ABIST implementation represented by array system support elements and their configuration. The redundancy allocation support described herein is, but not restricted to, two dimensional in reference to the row and column addressing within the structure of the memory array under test. There may exist a plurality of redundant row and column elements thus supported by the Redundancy Support Registers. The self test engine provides the deterministic array test patterns. The compare function has as its inputs, the expected data vector and the memory array outputs. It provides an overall pass/fail result signal which is used in combination with the gating controls from the self test engine to control the redundancy support registers in establishing real time redundancy allocation.

Figure 2:
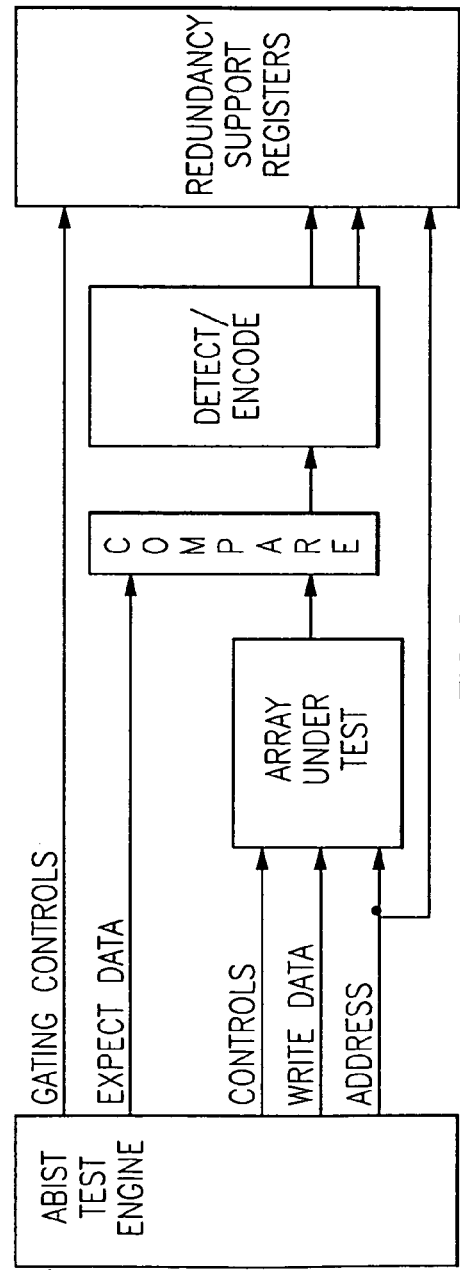
FIG. 2 illustrates another variation of an ABIST element configuration with support elements used again, but not restricted to, in support of two dimensional memory array redundancy allocation.

FIG. 2. below, shows another variation of a ABIST element configuration with support elements used again, but not restricted to, in support of two dimensional memory array redundancy allocation. The exception here, is that there may exist a plurality of row and what will be referred to as column group elements within the memory array structure. These column group elements are not selected by memory array column addressing alone, but instead coincide with a data input/output element in whole or in part.

In this art, one of the redundant/repairable element dimensions correspond to an array I/O in whole or in part. The compare element no longer compresses the test result to a single pass/fail signal, but instead provides individual result signals for each memory array data-out. The Detect/Encode circuit element is thus employed to determine memory array fail repair-ability, first by signaling that one and only one repairable element is failing and then providing an encoded representation, or "effective" address to be processed by the two dimensional redundancy support register. Again, not all memory array addressing bits may be needed by the redundant element allocation register, only those sufficient to uniquely describe/address the redundant element invocation.

FIG. 3. illustrates the preferred embodiment of the ABIST diagnositic apparatus element connection for the diagnostic tests herein described. Note shall be made that in typical support of redundancy allocation, not all memory array addressing bits may be needed. For the purposes of this embodiment, all memory addressing bits are brought to the Diagnostic apparatus. Second, the Redundancy Support Register, in this preferred embodiment, is, but not restricted to, providing two dimensional redundancy support of the memory device under test.

Thus the diagnostic register is not intrusive in existing Abist design methodologies. As can be seen, its function is parallel and independent of the remaining Abist elements. For applications different than this described preferred embodiment, additional elements of the detect and encode element can be brought out of the existing ABIST path if not needed, and used solely for the diagnostic register, slightly increasing the overhead area. In fact, this method and apparatus can be applied even when no redundancy support is required. This will in practical situations be unlikely, since the large array macros drive both redundancy applications for yield improvement, and will gain the most from yield diagnostics using this method, whereas the smaller macros typically without yield focus, will not derive as much benefit from targeted diagnostic activity.

The method and apparatus for the proposed "diagnostic register" will now be described in more detail. There are two inputs to the apparatus, namely an overall validated fail signal from the ABIST compare function, and the address buss comprised of memory array address signals concatenated with the encoded data-out address of the memory array. Any single cell fail occurring within the memory array is thereby uniquely described in a minimally encoded address. Multiple cell fails spanning more than one, or numerous, observed data bits are encoded to an all "1"s state in the encoded data out address field. The positive attributes of the encoding methodology will be discussed later in comparison to other available or potential solutions to the problem herein stated, and the potential restrictions of the methodology will be summarily resolved in light of the physical limitations of failure analysis itself.

Figure 4:
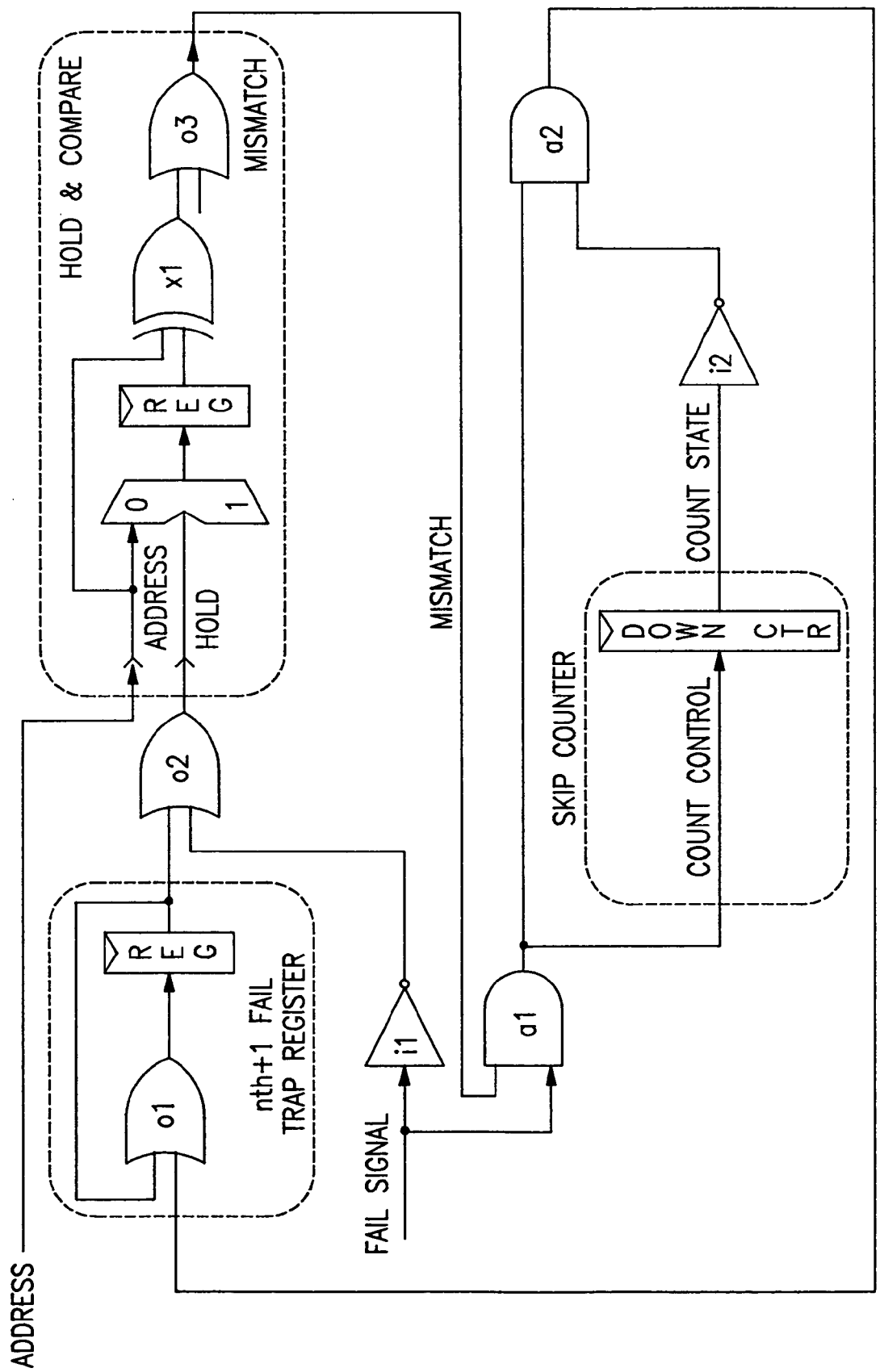
FIG. 4 illustrates that in the preferred embodiment the apparatus employed is composed of three primary elements, a fail trap register, a skip fail counter, and a hold and compare function.

FIG. 4 shows the ABIST diagnostic apparatus that in the preferred embodiment is composed of three primary elements, a fail trap register, a skip fail counter, and a hold and compare function. The first review will be of circuit function with the skip counter initialized to zero, or what will be referred to as "record first fail" mode, and then with non-zero values of the skip counter to "record $N^{th}+1$ fail". "Record first fail" is considered the default or base function of the method and apparatus. The initial state of all registers is defined to be "0", and is obtained through scan initialization of the LSSD registers in the preferred embodiment.

The skip counter output labeled "count state" is at "0" when the counter bits count down to the all "0" state or are pre-initialized to "0", sensitizing gate a2. The address inputs are usually advancing during the course of memory testing, and will at the occurrence of any fail, by definition of including the encoded fail address of the memory array data bit, a mismatch condition will exist. Gate a1 is thus sensitized to the Fail Signal input pin. Given no fails (yet) from the ABIST compare during memory test, the Fail Signal input is at "0", desensitizing gates i1 and o2, keeping gate o2 at a "1" state. If the Fail Signal input stays at "0", then the "0" value is maintained in both the fail trap register and the hold and compare registers. Thus, as soon as the Fail Signal input goes to "1", then the hold and compare register multiplexors will be redirected to provide the fail address as new data to the registers themselves. On the next clock event, the fail trap register will set to the "1" state. Simultaneously the hold and compare registers will set with the failing address information. Now the fail trap register controls the hold and compare multiplexors in the data hold state, such that for all subsequent clock cycles, the first fail address data is held, until the data is retrieved via the LSSD scan port of the register latches.

When the skip counter is initialized to a non zero state, then its function is to count down from the pre-initialized state, whereby its output, count state, will be "1" until the zero state of the down counter is reached. The non-zero state of the skip counter therefore blocks the fail input signal from reaching the fail trap register through gate a2. This mode is held until the intended $N^{th}+1$ fail point is reached, when the skip counter reaches the zero state, operation is as described for the above pre-initialization to "0" state. Operation of the hold and compare register is such that the address of each fail is loaded. Any subsequent fail is compared against the stored failing address, and only unique and new failing addresses will be counted by decrementing the skip counter, and reloading the new address into the hold and compare register. This is accomplished by the mismatch signal line that allows sensitization of gates a1 only when the new fail address is different than the last fail encountered. The hold and compare register structure is made up of an LSSD register as wide as the number of memory address and encoded address bits in total. Each register bit input is multiplexed between either the register bit itself in hold mode, or new address data when the hold signal line is "0". The address input is connected to the multiplexor input as just described, and also one side of an exclusive-or (compare function) with the register bit itself. Therefore each bit of the entire address field is compared with the contents of the hold register on a bit by bit basis. The outputs of the exclusive-ors are logically OR'ed to form an overall mis-compare result. Multiple occurrences of the same fail in the memory array are thereby precluded from advancing the skip counter. The skip counter is implemented as a binary down counter that will advance from the preprogrammed state on each occurrence of the fail signal and a unique value of the failing address field through gate a1, and the next occurrence of a clock signal.

This method and apparatus allows for real time collection of the first failing memory array cell, and with additional initialization programming of up to the $N^{th}+1$ failing cell. This capability of in-situ collection of cell diagnostic data is provided with minimal on-chip hardware apparatus, and no impact to test time, throughput, or external test hardware resource. As was described in the problem solved description statement, this not only reduces resource and expensive re-test effort to gather this information in a traditional manner, it provides for collection of this data at levels of assembly and during high speed on product clock generation driven test that has been effectively prohibited by prior or current art to date. In addition, this data is now provided during initial wafer manufacturing final test which provides significant yield monitoring capability never provided at such low cost (or any cost) in current or prior art.

The advantage of this proposal is such that although seemingly straightforward in some ways, the unique application of a detect and encode circuit restricting encoded states to a single bit of the entire field as being the sufficient case, allows for the minimal number of states required to be encoded to be equal to the number of data-out bits +1 (multiple fail state). This represents a significant reduction in the number of hardware register bits to store effective fail information. This taken in context of today's high speed applications, the ABIST implementations utilize the same pipeline and performance techniques applied to system design. This exacerbates the hardware requirements necessary to synchronize a brute force data collection of output data from large memory array designs. The preferred embodiment described herein effectively 'piggybacks' onto existing pipeline data structures in place to support redundancy allocation with minimal expansion to support storage of the full memory addressing buss, but not to the pipeline depths required for the current art.

In terms of traditional diagnostic requirements that all failing data outputs need be required for diagnostic data collection, although possibly providing comfort, the information is usually not taken advantage of. This claim is made in context of physical failure analysis techniques that require a single defect to be targeted due to the investigative and destructive nature of mechanically unlayering to reach measurable and quantifiable determinants of failure mechanisms. If the defect isolation is to a peripheral circuit within the memory array causing all outputs to fail, then individual array data-out fail information is not specific, and the peripheral circuit diagnostic information is then solely available within the address field that is stored. More importantly, since it is claimed that this method and apparatus provides immediate diagnostic information for early life stress activity, then the largest number of failure mechanisms are usually singular failures of individual cells in the memory cell array. This method provides clear advantage in this area for recording the most prevalent failure mechanism.

One of the possible on-chip alternatives to the above method and apparatus which has been considered during our own development would use a straightforward pipeline of the full address buss and the full data output buss of the memory array under test up to the point of synchronization with the ABIST determination of a fail. After our analysis we determined that his alternative requires more hardware, and in some applications could result in hundreds of additional registers to store the output data necessary, to just store the first fail information, for one instance of an array macro. The method and apparatus described as our preferred embodiment has definitive benefit over this alternative.

A second alternative proposal which has been considered for resolving the requirements of diagnostic data collection was to provide an additional copy of the memory array macro on-chip, and to reconfigure ABIST to test the target memory while storing the bit by bit compare results into the "spare" memory macro. Then at some point, another macro becomes the target, and the previously successfully tested target becomes the new data collection/storage device. This second alternative proposal is theoretically viable but we believe it would add additional complexity and area impacts on chip as compared to the preferred embodiment.

A third alternative to the preferred embodiment which has been considered is a alternative which would provide extensive on product clock generation control circuitry to the chip to be tested, whereby the effective number of on product generated clock cycles can be counted and specifically controlled such that a more traditional approach to diagnostic data collection can be implemented. We believe that this is also a valid and workable approach, even though it is not our preferred embodiment because when such circuitry resides on chip for purposes of system control and it can also be used for memory array cell diagnostic activity, although again we do not consider this our preferred embodiment because it does involve more tedious and interactive data collection algorithms to achieve comparable results. If this circuitry, design complexity, and intrusion into the basic clocking methodology of the chip infrastructure is required for test support, then, the design and usage resource requirements (both hardware and manpower) will normally preclude the design benefit obtained by the third alternative.

The application of our method and appratus is particularly useful in system devices related to high speed processing of data, and can be implemented in devices such as used for cache memory ABIST for high speed processors, including double processor chips where elements are divided into two smaller chips which can be separately tested for improvements in yield and cost, as well as for other memory units and array designs used in complex logic. The design can enable improvements in implementation of complex logic designs allowing CMOS performance to improve with merged logic-DRAM, SDRAM, low power technologies, and unique packaging alternatives, and enable processor speed and cost improvements in addition to those obtained by cycle time improvements due to technology scaling.

While the preferred embodiment to the invention has been described, it will be understood that those skilled in the art, both now and in the future, may make various improvements and enhancements which fall within the scope of the claims which follow. These claims should be construed to maintain the proper protection for the invention first described.

What is claimed is:

1. A method for real time capture of the desired failing chip cell diagnostic information from high speed testing of a semiconductor chip, comprising the steps of:

collecting data from scanning the circuits of said semiconductor chip having LSSD diagnostic registers on chip for a failing cell for desired handing of multiple failures on a failing chip for immediate scan-out off-chip at a level of assembly test after scan initialization of the LSSD diagnostic registers on the semiconductor chip, said level of assembly test being selected from any level of a group consisting of: an initial manufacturing wafer test, a module test, a system level test, regardless of the clocking methodology, and for the desired failing chip handling on chip of multiple bit failure detection:

providing data collection of a first failing cell in said LSSD diagnostic registers, and then skipping the collection of data up to a programmed amount to skip up to a subsequent failing cell, and recording the failure of a next failing cell recognized after said subsequent failing cell in said LSSD diagnostic registers while making reuse of logic including existing address registers for providing data synchronous with fail determination circuits for data collection used for collection of data of said first failing cell, and then pinpointing an actual failure for said next failing cell using additional data collected by reuse of the logic for data collection used for collection of data of said first failing cell.

2. The method according to claim 1 wherein the semiconductor chip is provided on chip with supplemental address registers which supplement said existing address registers for providing data synchronous with fail determination circuits, employing ABIST comparison circuit to obtain a bit wise fail result vector corresponding to each device data out of a device under test, and wherein said bit wise fail result vector feeds a detect and encode circuit that determines if one and only one device data out failed, and if so, provides an encoded "address" that is concatenated to a corresponding register address field.

3. The method according to claim 2 wherein said bit wise fail result vector is fed thereafter into a hold and compare function circuit having a hold portion of the function providing for the "full" fail address field comprising multiple bits of the memory address of the device under test plus the failing output encoded address for identifying the failing location to be stored in a LSSD register of said semiconductor chip, and wherein the compare function provides for identification recording of subsequent unique and different failing locations to be identified in the device under test.

4. The method according to claim 3 wherein said hold and compare function circuit is configured to load the first and reload each subsequent unique failing location encountered, decrementing a programmable skip counter at each unique fail encountered, until said programmable skip counter reaches a final "zero" state.

5. The method according to claim 4 wherein said hold and compare function circuit is configured to load the first and reload each subsequent unique tailing location encountered, decrementing a programmable skip counter at each unique fail encountered, until the skip counter reaches an intended next failing cell recognized fail to be recorded.

6. The method according to claim 5 wherein said hold and compare function circuit allows said programmable skip counter to record a zero state as a default thus enabling the first fail to be recorded.

7. The method according to claim 1 wherein said supplemental address registers which supplement said existing address registers for providing data synchronous with fail determination circuits include a fail trap register, and there is provided a programmable skip counter, and a hold and compare function circuit, and wherein said programmable skip counter is enabled for initialization to a "record first fail" mode, and then with non-zero values of the programmable skip counter to a "record a next fail" mode, wherein said "record first fail" mode is considered the default or base function when the initial state of all registers is defined to be "0", and is obtained through scan initialization of the LSSD registers of the semiconductor chip.

* * * * *